(12) United States Patent
Legerton

(10) Patent No.: US 9,844,188 B2
(45) Date of Patent: Dec. 19, 2017

(54) MODULAR TRAY

(71) Applicant: Hunter Legerton, Mt. Pleasant, SC (US)

(72) Inventor: Hunter Legerton, Mt. Pleasant, SC (US)

( * ) Notice: Subject to any disclaimer, the term of this patent is extended or adjusted under 35 U.S.C. 154(b) by 122 days.

(21) Appl. No.: 14/681,664

(22) Filed: Apr. 8, 2015

(65) Prior Publication Data

US 2015/0282433 A1  Oct. 8, 2015

Related U.S. Application Data

(60) Provisional application No. 61/976,743, filed on Apr. 8, 2014.

(51) Int. Cl.
*A01G 9/02* (2006.01)
*A01G 1/00* (2006.01)

(52) U.S. Cl.
CPC .................... *A01G 1/007* (2013.01)

(58) Field of Classification Search
CPC ........ A01G 9/022; A01G 9/025; A01G 9/028; A01G 1/007; A01G 9/023
USPC .......................................................... 47/65.9
See application file for complete search history.

(56) References Cited

U.S. PATENT DOCUMENTS

| | | | | |
|---|---|---|---|---|
| 5,095,649 A | * | 3/1992 | Brownlee | A47G 7/041 47/41.01 |
| 5,953,859 A | * | 9/1999 | Cochran | A01G 9/028 47/41.1 |
| 6,499,249 B1 | * | 12/2002 | Luijkx | A47F 7/0078 206/423 |
| 6,711,851 B2 | | 3/2004 | Mischo | |
| 7,080,482 B1 | * | 7/2006 | Bradley | A01G 31/02 47/60 |
| 7,788,848 B1 | * | 9/2010 | Koumoudis | A01G 9/025 47/65.9 |
| 8,479,443 B2 | | 7/2013 | Buist | |
| 8,646,205 B2 | * | 2/2014 | Cho | A01G 9/025 47/66.6 |

(Continued)

FOREIGN PATENT DOCUMENTS

| | | |
|---|---|---|
| EP | 2108249 A1 | 10/2009 |
| EP | 2331768 B1 | 3/2013 |

(Continued)

*Primary Examiner* — Monica Williams
(74) *Attorney, Agent, or Firm* — Michael G. Johnston; Moore & Van Allen PLLC

(57) ABSTRACT

A modular tray is provided for covering a portion of a surface with vegetation in a growth medium. The tray includes a pair of sidewalls, and a lower end wall and an upper end wall extending between and interconnecting the ends of the sidewalls such that the walls define a perimeter of the tray. A bottom wall extends between and interconnects the ends of the sidewalls and the lower end wall and extends in a plane disposed at an angle with the respect to the longitudinal axis of the sidewalls. Each of a plurality of platforms extends between and interconnects the sidewalls and are disposed at an angle with respect to the longitudinal axis of the sidewalls. Each of a plurality of risers extends between the rear edge of a platform to the front edge of an adjacent platform. The tray is water impermeable for accommodating the growth medium and vegetation.

21 Claims, 15 Drawing Sheets

(56) References Cited

U.S. PATENT DOCUMENTS

| | | | |
|---|---|---|---|
| 2009/0223126 A1* | 9/2009 | Garner | E04F 13/081 47/66.7 |
| 2010/0146855 A1* | 6/2010 | Ma | A01G 9/025 47/82 |
| 2011/0030291 A1 | 2/2011 | Whitfield | |
| 2011/0258925 A1* | 10/2011 | Baker | A01G 9/023 47/65.8 |
| 2011/0289839 A1 | 12/2011 | Cronk et al. | |
| 2012/0227319 A1 | 9/2012 | Jaslow | |
| 2012/0227320 A1* | 9/2012 | Dos Santos | A01G 9/025 47/79 |
| 2012/0240463 A1 | 9/2012 | Bindschedler et al. | |
| 2014/0325907 A1* | 11/2014 | Meyer | A01G 9/023 47/82 |

FOREIGN PATENT DOCUMENTS

| | | |
|---|---|---|
| EP | 2681990 A1 | 1/2014 |
| WO | 2007/112145 A2 | 10/2007 |
| WO | 2009/156742 A1 | 12/2009 |

* cited by examiner

MODULAR TRAY

CROSS-REFERENCE

This application is related to U.S. provisional application No. 61/976,743, filed Apr. 8, 2014, entitled "SLOPE STABLE MODULAR GREEN ROOF", naming Hunter Legerton as the inventor. The contents of the provisional application are incorporated herein by reference in their entirety, and the benefit of the filing date of the provisional application is hereby claimed for all purposes that are legally served by such claim for the benefit of the filing date.

BACKGROUND

A modular tray is described for use as an element for constructing a green roof and, more particularly, a modular tray for use in pitched green roof.

A green roof is a roof or other structure at least partially covered by vegetation, providing numerous benefits to the building. For example, a green roof system significantly reduces storm-water runoff and filters the water that does run off of the roof.

Modular green roof systems utilize portable trays that function as independent growing containers. The modular trays make green roof design and construction more widely accessible. The trays may be delivered to the site as fully grown units that are simply laid in place on the roof. The trays are typically plastic trays with drain holes provided along the sides or the bottom. The trays are filled with growing medium and plants and placed on a roof. Excess rainwater is intended to flow through the tray out of the holes and onto the roof.

Most modular green roof trays are designed for flat or low-slope roofs. One concern of pitched roofs is an unequal water distribution from top to bottom of the roof simply due to gravitational effects resulting in drier conditions at the top and wetter conditions at the bottom of an inclined or pitched roof. Modular trays designed to retain specific amounts of water on flat roofs, and thus be self-sustaining, cannot retain this water on pitched roofs. Therefore, the modular trays do not perform as well on pitched roofs or require irrigation systems to make up for the lack of collected water in the module. Sloped roof applications often require considerable improvisation and custom engineering.

For the foregoing reasons, there is a need for a modular tray for use in a green roof system on a sloped roof. The new modular tray should be easily transported and reliably installed and provide for moisture collection and retention in the modular tray in the sloped roof application.

SUMMARY

A modular tray is provided for covering a portion of a surface with vegetation in a growth medium. The tray includes a pair of sidewalls, and a lower end wall and an upper end wall extending between and interconnecting the ends of the sidewalls such that the walls define a perimeter of the tray. A bottom wall extends between and interconnects the ends of the sidewalls and the lower end wall and extends in a plane disposed at an angle with the respect to the longitudinal axis of the sidewalls. Each of a plurality of platforms extends between and interconnects the sidewalls and are disposed at an angle with respect to the longitudinal axis of the sidewalls. Each of a plurality of risers extends between the rear edge of a platform to the front edge of an adjacent platform. The tray is water impermeable for accommodating the growth medium and vegetation.

A modular green roof system comprises a plurality of water impermeable trays for containing growth medium and vegetation. Each tray includes a pair of sidewalls, a lower end wall and an upper end wall extending between and interconnecting the ends of the sidewalls such that the walls define a perimeter of the tray. A bottom wall extends between and interconnects one end of the sidewalls and the lower end wall. The bottom wall extends in a plane disposed at an angle with the respect to the longitudinal axis of the sidewalls. A plurality of platforms have a front edge and an opposed rear edge and extend between and interconnect the sidewalls. The platforms are disposed at an angle with respect to the longitudinal axis of the sidewalls. Each of a plurality of risers extend between the rear edge of a platform to the front edge of an adjacent platform. The trays are releasably connected to one another resting on a roof in side-by-side relation so as to cover a predefined area on the roof to establish a green roof.

A method of constructing a modular green roof system for a roof comprises the steps of providing a plurality of modular trays, filling the trays with green roof materials, positioning the trays onto an area of the roof in adjacent side-by-side relation, and interconnecting the adjacent trays. Each tray includes a pair of sidewalls, a lower end wall and an upper end wall extending between and interconnecting the ends of the sidewalls such that the walls define a perimeter of the tray. A bottom wall extends between and interconnects one end of the sidewalls and the lower end wall. The bottom wall extends in a plane disposed at an angle with the respect to the longitudinal axis of the sidewalls. A plurality of platforms each has a front edge and an opposed rear edge. The platforms extend between and interconnect the sidewalls and are disposed at an angle with respect to the longitudinal axis of the sidewalls. Each of a plurality of risers extends between the rear edge of a platform to the front edge of an adjacent platform.

BRIEF DESCRIPTION OF THE DRAWINGS

For a more complete understanding of the modular tray, reference should now be had to the embodiments shown in the accompanying drawings and described below. In the drawings.

DESCRIPTION

Figure 1:
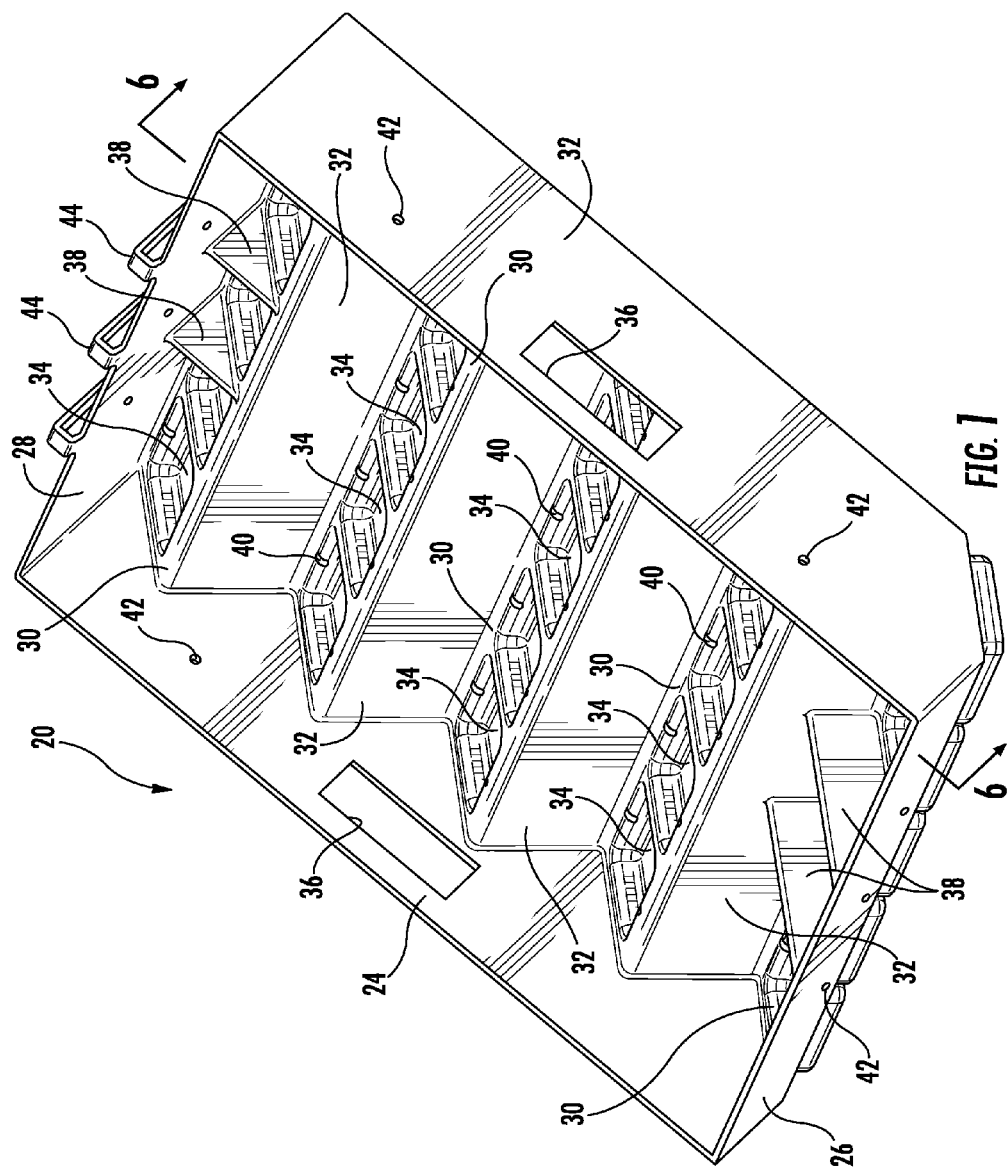
FIG. 1 is a front perspective view of an embodiment of a modular plant tray.
Figure 2:
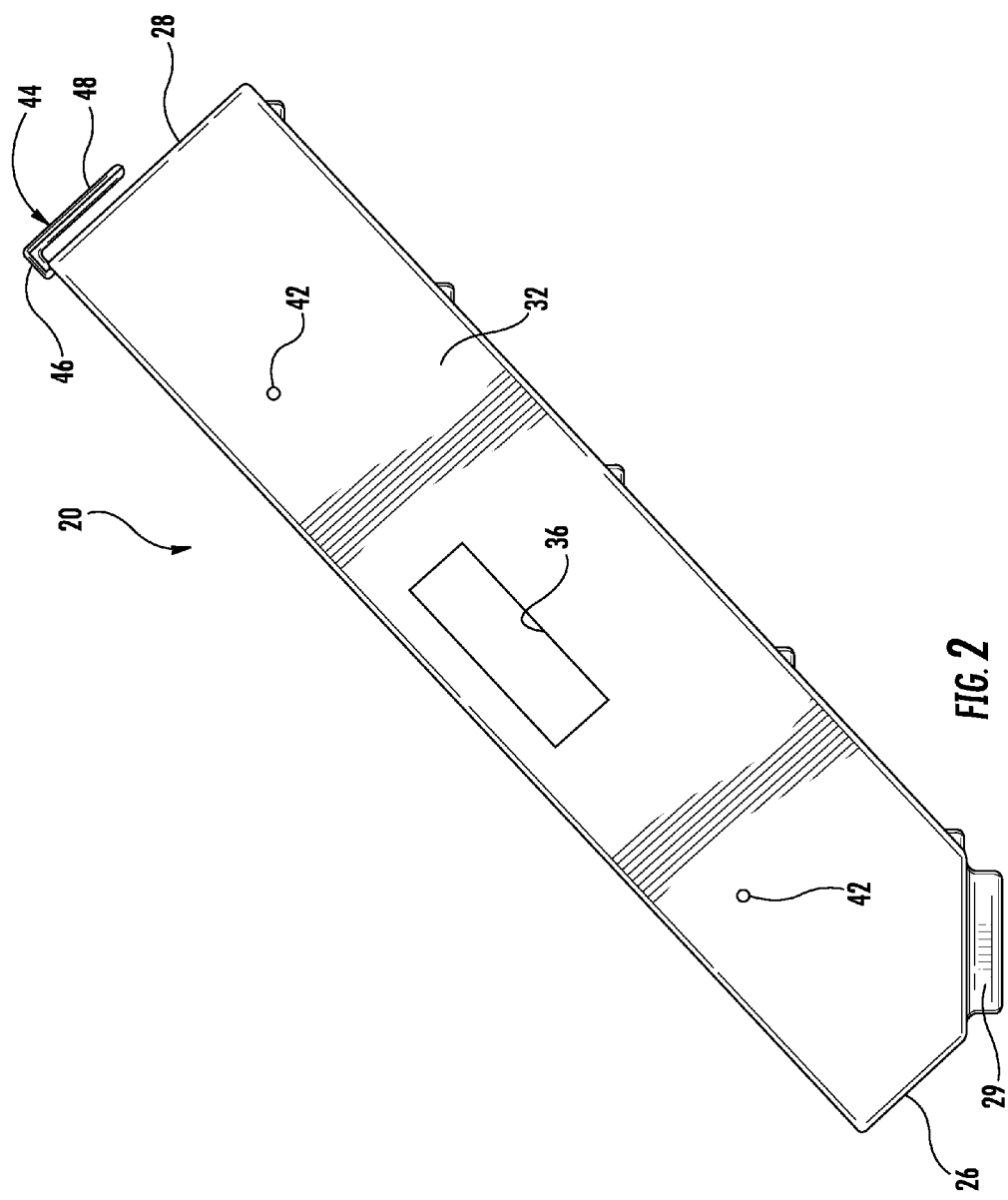
FIG. 2 is a right side elevation view of the modular plant tray as shown in FIG. 1, the left side elevation view being a mirror image.
Figure 3:
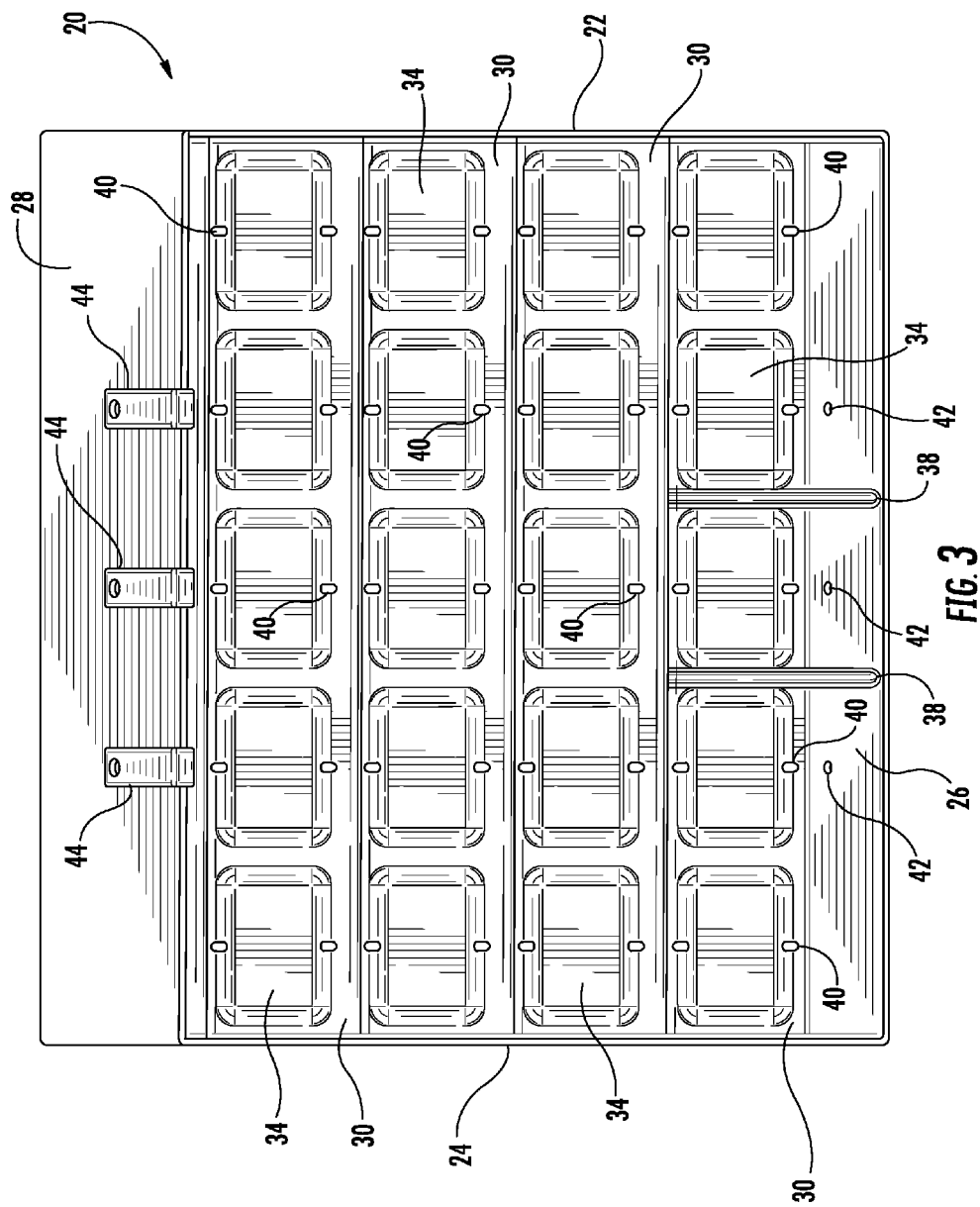
FIG. 3 is a top perspective view of the modular plant tray as shown in FIG. 1.
Figure 4:
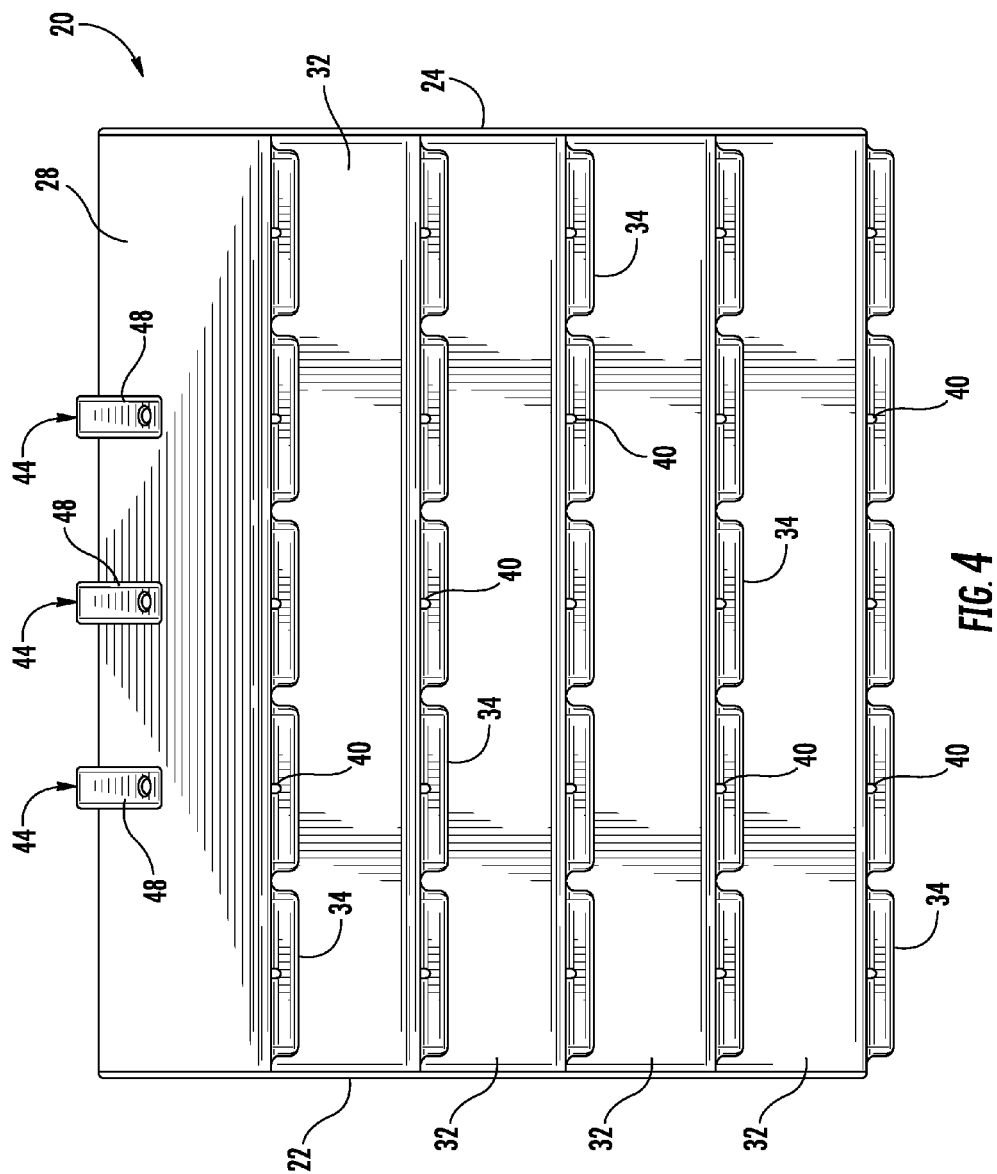
FIG. 4 is a bottom perspective view of the modular plant tray as shown in FIG. 1.
Figure 5:
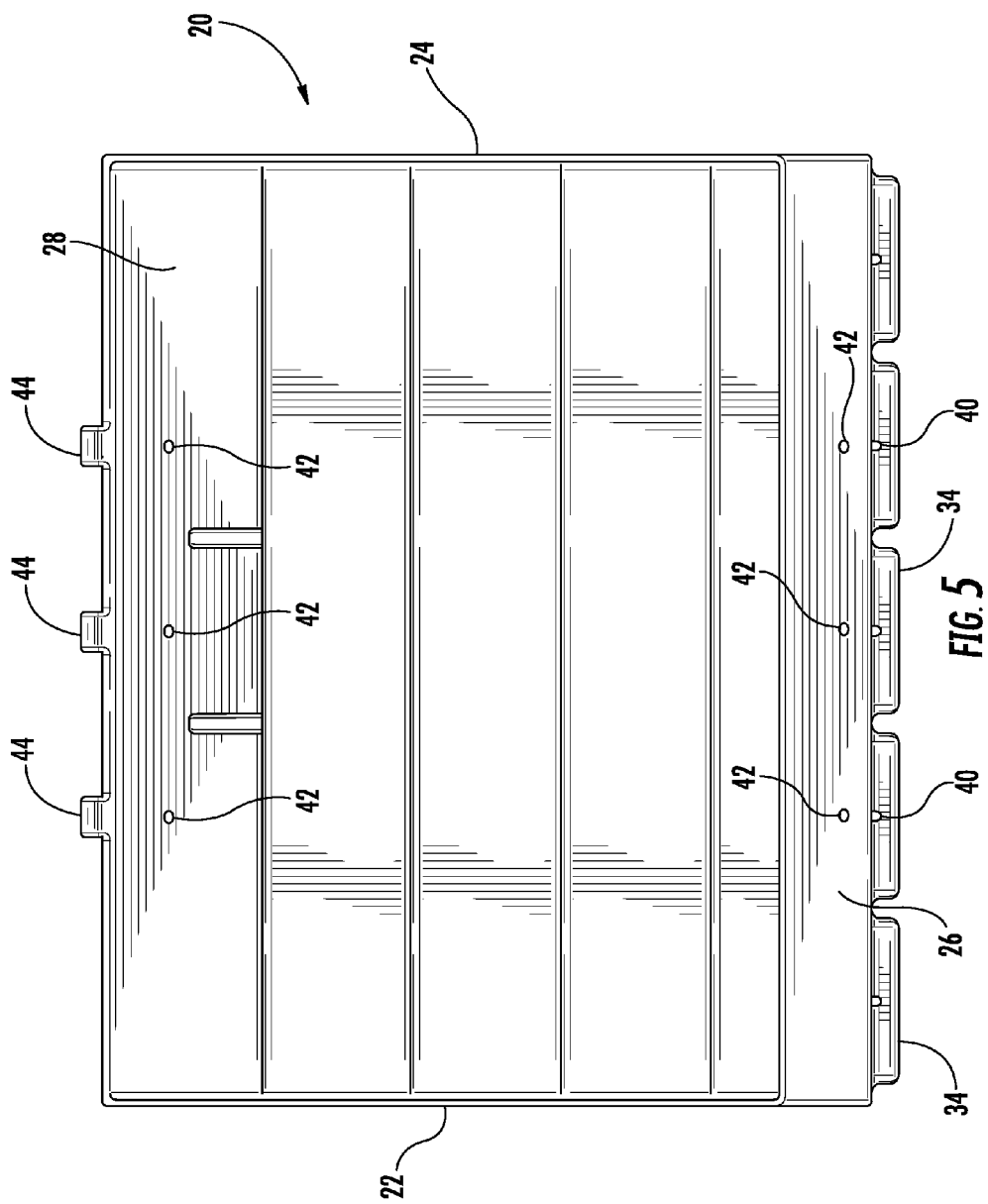
FIG. 5 is a bottom plan view of the modular plant tray as shown in FIG. 1.
Figure 6:
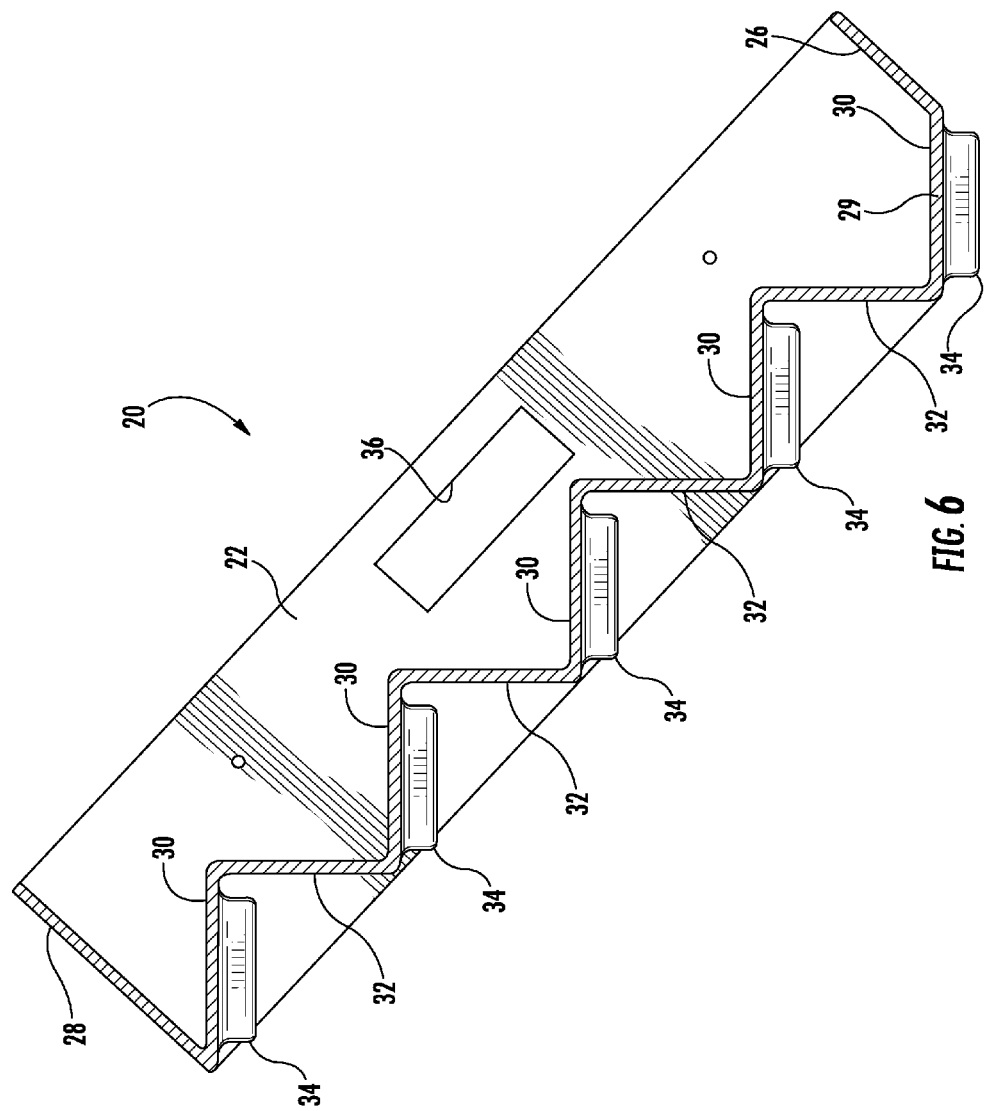
FIG. 6 is a longitudinal cross-section view of the modular plant tray as shown in FIG. 1.
Figure 7:
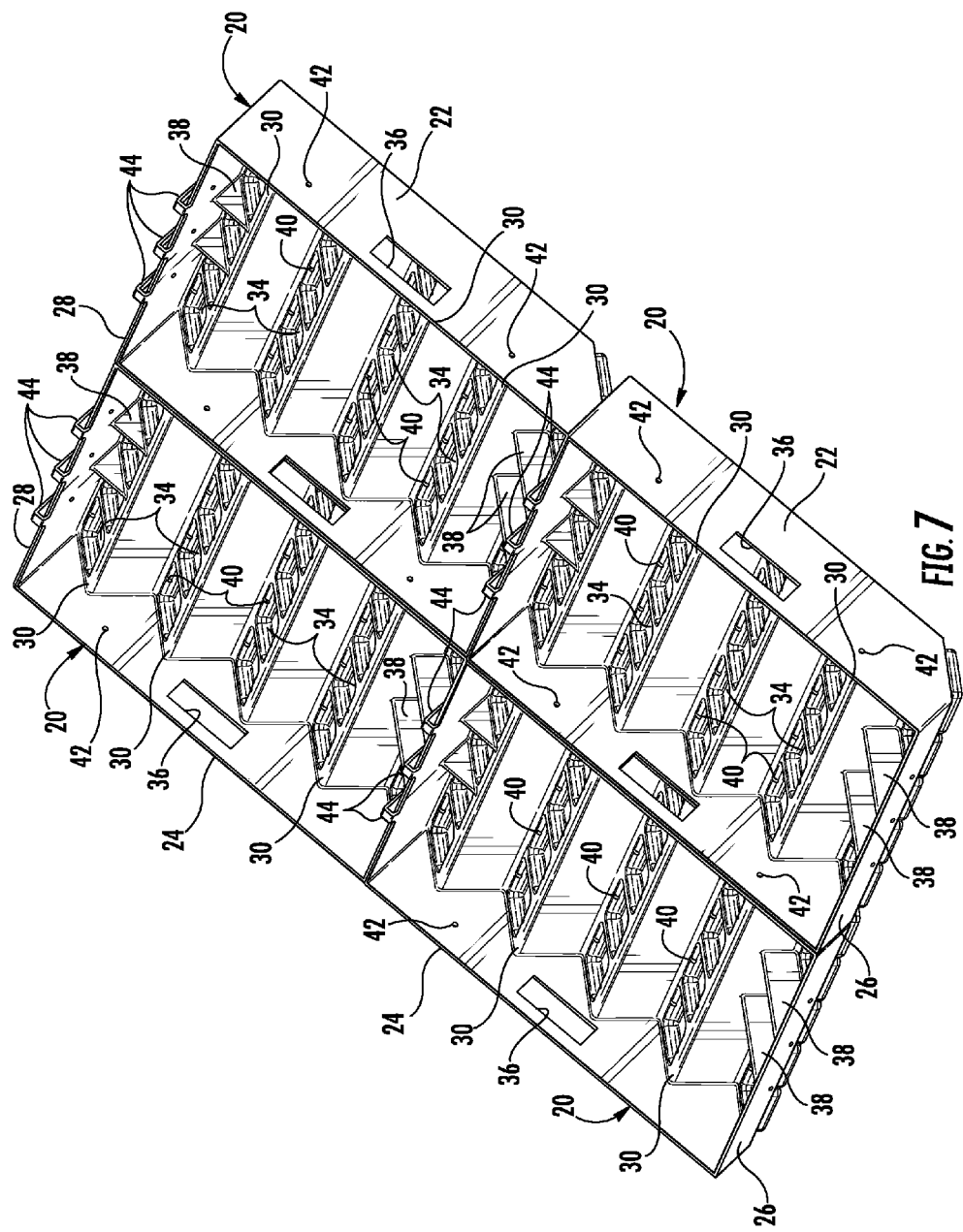
FIG. 7 is a front perspective view of four of the modular plant trays as shown in FIG. 1 connected to one another.
Figure 8:
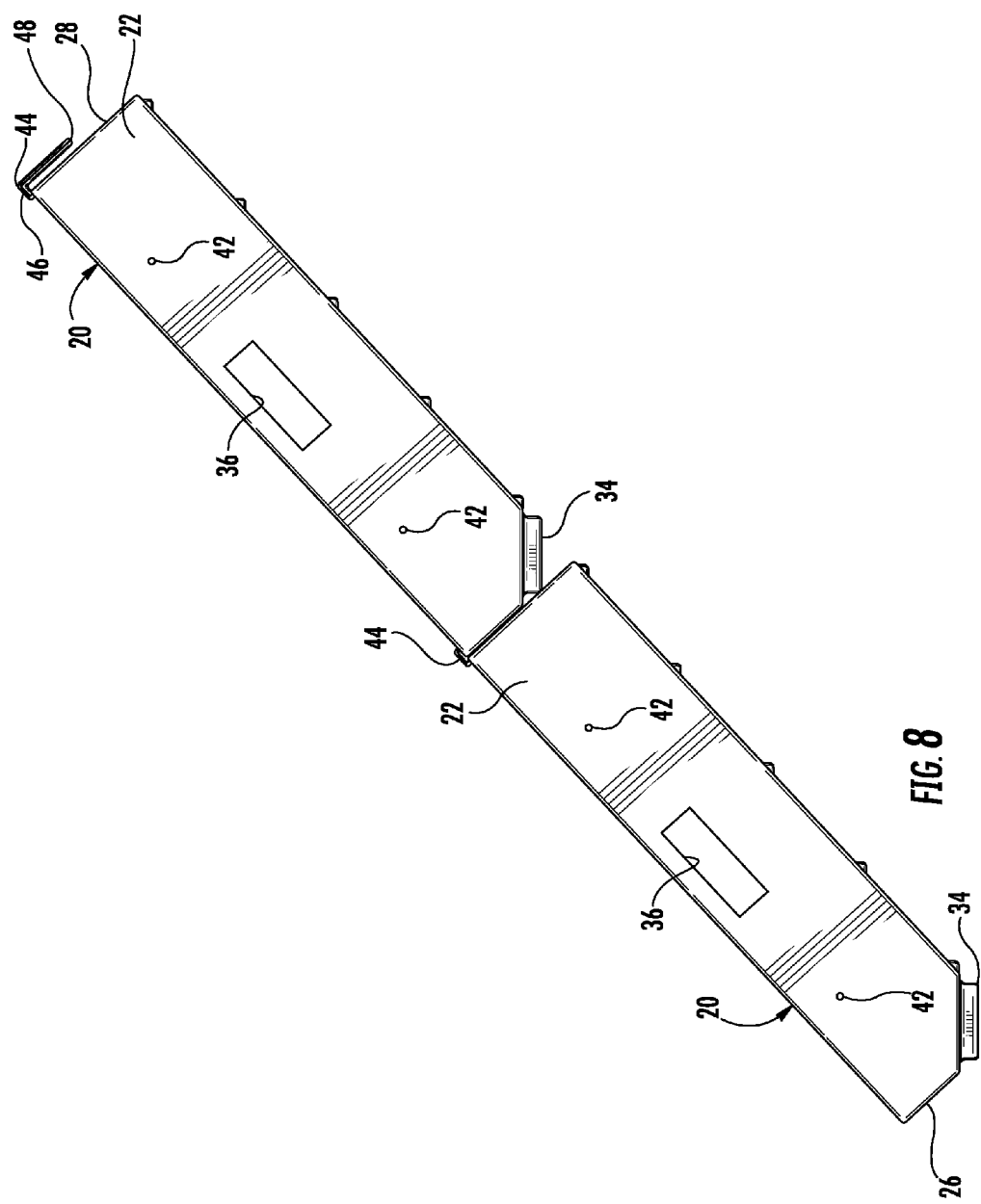
FIG. 8 is a right side elevation view of the connected modular plant trays as shown in FIG. 7.
Figure 9:
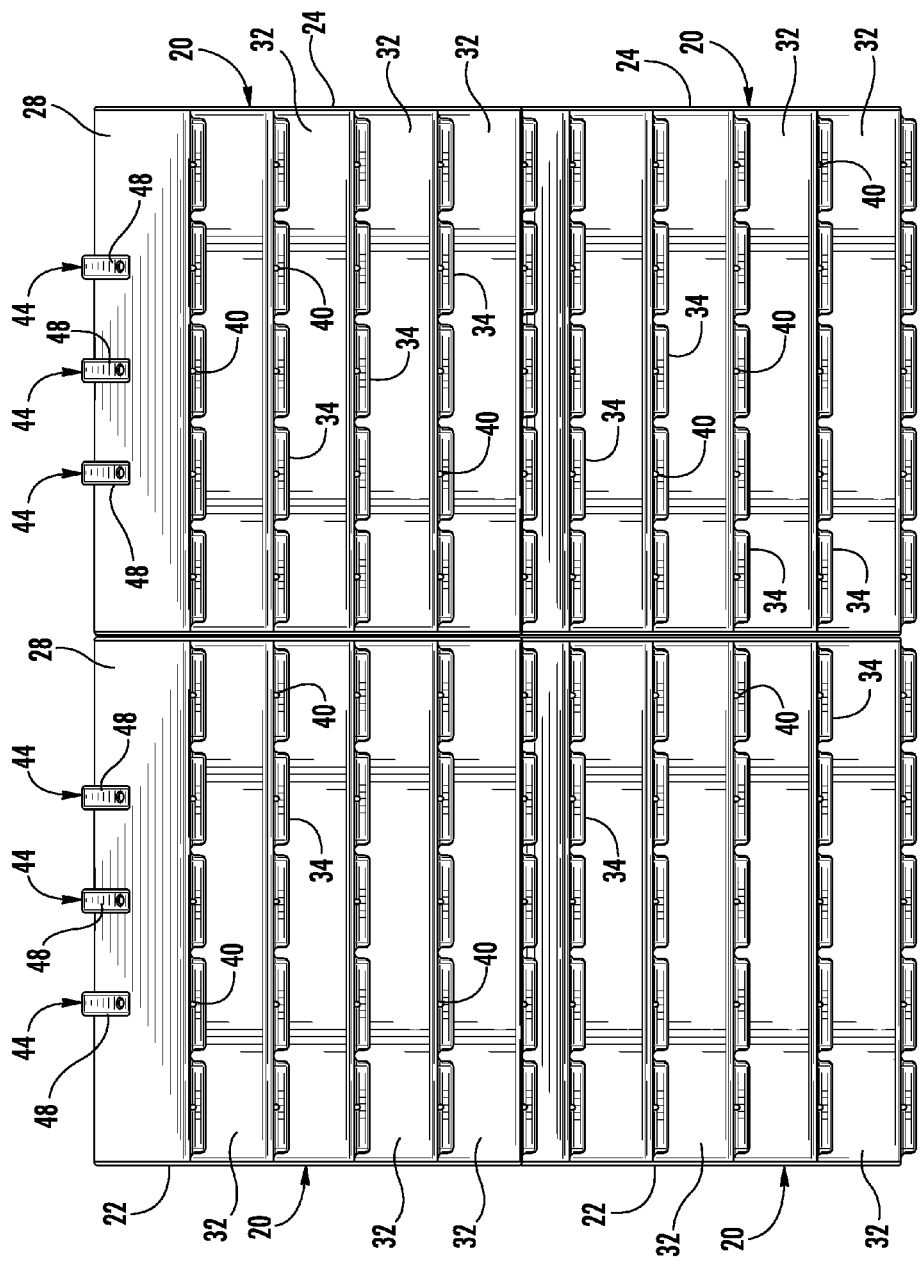
FIG. 9 is a bottom perspective view of the connected modular plant trays as shown in FIG. 7.
Figure 10:
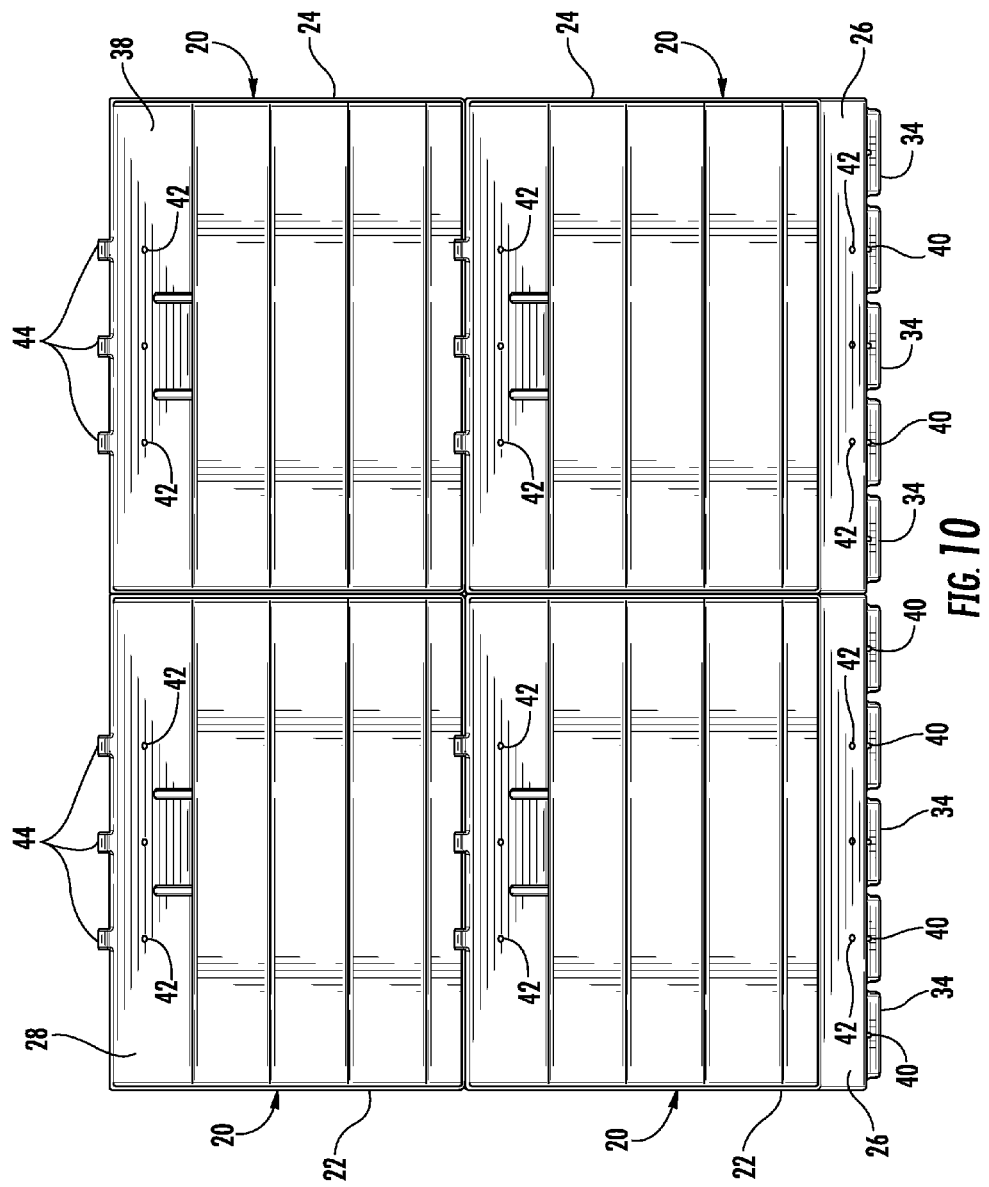
FIG. 10 is a bottom plan view of the connected modular plant trays as shown in FIG. 7.

Certain terminology is used herein for convenience only and is not to be taken as a limitation on the invention. For example, words such as "upper," "lower," "left," "right," "horizontal," "vertical," "upward," and "downward" merely describe the configuration shown in the FIGs. Indeed, the components may be oriented in any direction and the terminology, therefore, should be understood as encompassing such variations unless specified otherwise.

Referring now to the drawings, wherein like reference numerals designate corresponding or similar elements throughout the several views, FIGS. 1-6 depict an embodiment of a modular tray generally designated at 20. The modular tray 20 provides means for containing a growing medium and vegetation for use as an element in a green roof application for a building. In the green roof application, a plurality of modular trays 20 may be joined together as a system for covering a surface with vegetation. As shown in FIGS. 7-10, for example, four modular trays 20 may be connected together and arranged to cover at least a portion of the surface.

The modular tray 20 may be formed from a suitable durable plastic and may further comprise a UV-resistant material. For example, the modular tray may be made from a thermoplastic material, such as amorphous polyethylene terephthalate (APET), crystalline polyethylene terephthalate (CPET), polypropylene (PP), acrylonitrile butadiene styrene (ABS) or other conventional thermoplastics. The modular tray 20 may also be made from 100% recycled high density polypropylene plastic. Materials other than plastics may be used as long as the material is durable and suitable for long term outdoor application, including, but not limited to, metals such as aluminum. Where the material of the modular tray 20 is a plastic, thermoforming techniques such as injection molding or vacuum forming may be used to produce the modular tray 20 as a single piece unit.

Referring to FIGS. 1-6, the modular tray 20 is generally rectangular in plan view, comprising two substantially parallel sidewalls 22, 24 and a lower end wall 26 substantially parallel to an upper end wall 28. The lower end wall 26 and the upper end wall 28 extend between and connect the ends of the sidewalls 22, 24 forming a perimeter. A bottom wall 29 extends between and interconnects the sidewalls 22, 24 and the lower end wall 26. The bottom wall 29 is angled with respect to the longitudinal axis of the sidewalls 22, 24. It is understood that the walls 22, 24, 26, 28 of the modular tray 20 may define other shapes including, but not limited to, a square and other suitable polygonal shapes that allow multiple trays to be joined together to cover a surface.

The modular tray 20 includes a plurality of parallel platforms 30 extending between the sidewalls 22, 24 and upwardly from the lower end wall 26 to the upper end wall 28. The platforms 30 extend at an angle with respect to the longitudinal axis of the sidewalls 22, 24 in the manner of stair treads. Risers 32 extend perpendicularly between the rear longitudinal edge and the front longitudinal edge of each of the platforms 30. In this configuration the area defined by the walls 22, 24, 26, 28 is impermeable to water except where holes or slots are defined in the walls.

Each of the platforms 30 defines a plurality of water retention cups 34 evenly spaced across the platform 30 between the sidewalls 22, 24. Each of the water retention cups 34 defines an interior space capable of retaining water as well as plants or other vegetation in a growing medium, including soil, and water. In the embodiment shown, there are twenty five water retention cups 34 evenly distributed across five platforms 30. It is understood that the number and size of the water retention cups 34 and the platforms 30 is a matter design choice and may be more or less than depicted or described herein.

A pair of opposed handles 36 is formed in the sidewalls 22, 24, with one handle 36 defined in each of the two sidewalls 22, 24 in the embodiment shown. The handles 36 are configured to receive a person's fingers to facilitate grasping of the modular tray 20 by human hands such that the modular tray may be lifted and carried by a person grasping onto the handles. The handles 36 also provide openings for allowing nutrients and water to pass between adjacent modular trays 20. While only two handles 36 are shown in the embodiment of FIGS. 1-10, it is understood that more than two handles 36 could be provided, if desired.

Ribs 38 are provided for reinforcement of the modular tray 20. The ribs 38 project perpendicularly from the inner surfaces of the lower end wall 26 and the upper end wall 28. The ribs 38 are integral with the platform 30 between adjacent water retention cups 34. The ribs 38 function as reinforcing structural members and are configured to provide rigidity to the modular tray 20 to prevent bending during shipping and handling or from the lateral forces imposed on the modular tray 20 when connected to other modular trays situated on a sloped roof.

Figure 13:
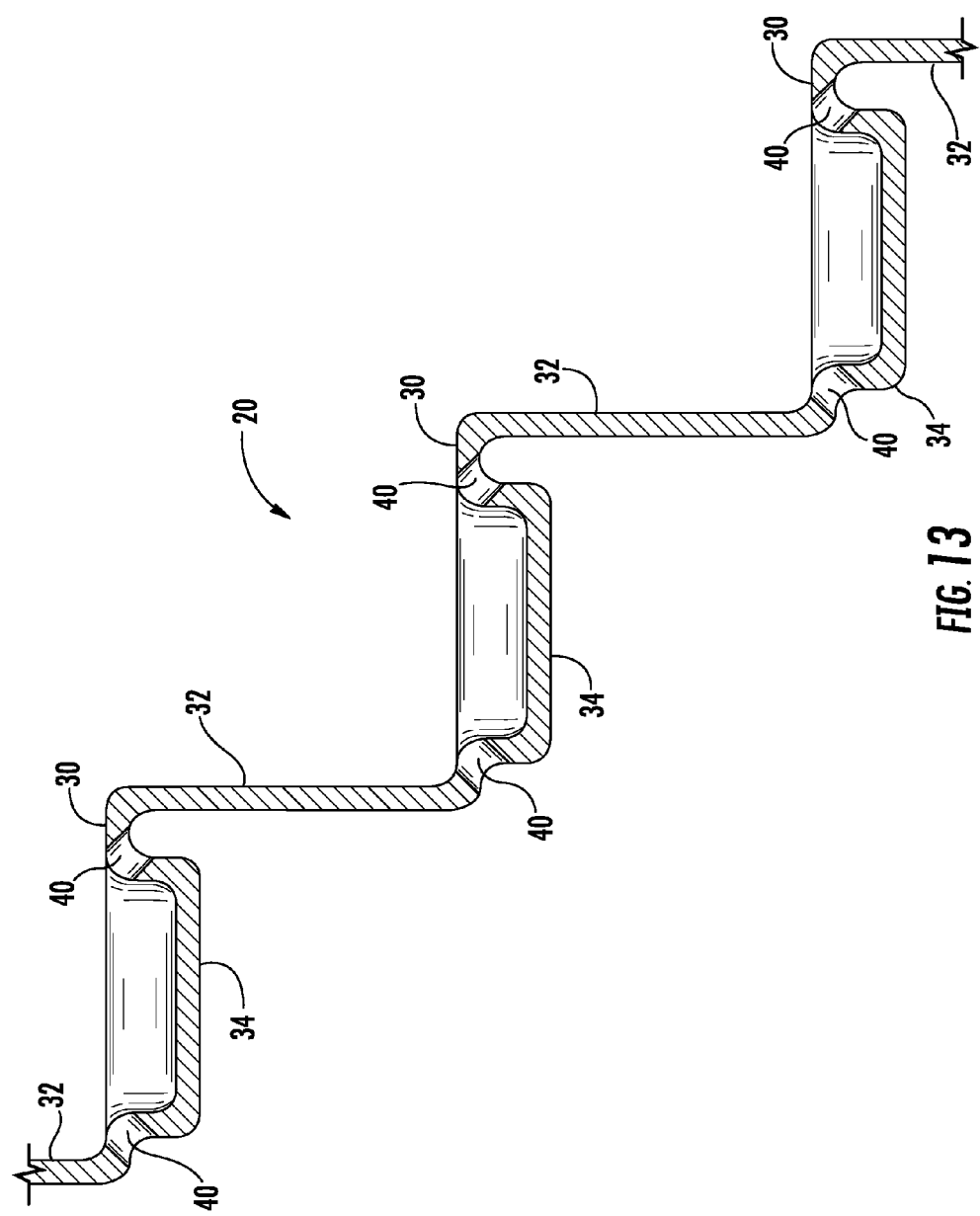
FIG. 13 is a longitudinal cross-section view of a portion of the modular plant tray as shown in FIG. 1.

As best shown in the FIG. 13, each water retention cup 34 has a pair of longitudinally opposed drainage slots 40 formed at an upper edge of the walls of the water retention cup 34. The slots 40 function to drain excess water not absorbed by the growth medium or vegetation medium from the modular tray 20 during extensive rainfalls or prolonged periods of rain. Arranging the slots 40 at a distance away from the bottom of the water retention cup 34 ensures good water retention in the water retention cup 34 due to a volume of the water retention cup 34 being below the slots 40.

Drainage holes 42 may be formed in the side walls 22, 24 and the end walls 26, 28 of the modular tray 20. The drainage holes 42 allow water to drain out of the modular tray 20 directly onto the roof and underneath the modular green roof system. It should be recognized that there are other modular tray 20 configurations that can be useful in certain embodiments while not utilizing the specialized openings in the sidewalls 22, 24 or the end walls 26, 28. For example, the modular tray 20 having drainage holes in only the sidewalls 22, 24 or only in the bottom wall 29 is considered to fall within the scope of the modular tray 20 described herein. It is further understood that the number or the size of the drainage holes 42 may be increased to increase drainage as needed, such as when the modular tray 20 is being used in an environment that experiences a significant amount of rain. Conversely, where the climate is particularly arid, it may be desirable to decrease the number or the size of the drainage holes 42.

A water permeable layer may be provided in the modular tray 20 between the platforms 30 and the growth medium. One example of a suitable water permeable layer is a geo-textile fabric sheet or mat such as woven or non-woven polyester or polypropylene, felt, canvas, tulle, or the like. The fabric is impermeable to growth medium for preventing the growth medium or roots associated with the vegetation from leaving the modular tray through the slots 40. The fabric may be placed on the bottom platform 30, or on all of the platforms, and held in place by, for example, an adhesive bond or staples. Suitable materials for the water permeable layer are well known by those of ordinary skill in the art and will therefore not be described in further detail herein.

Figure 11:
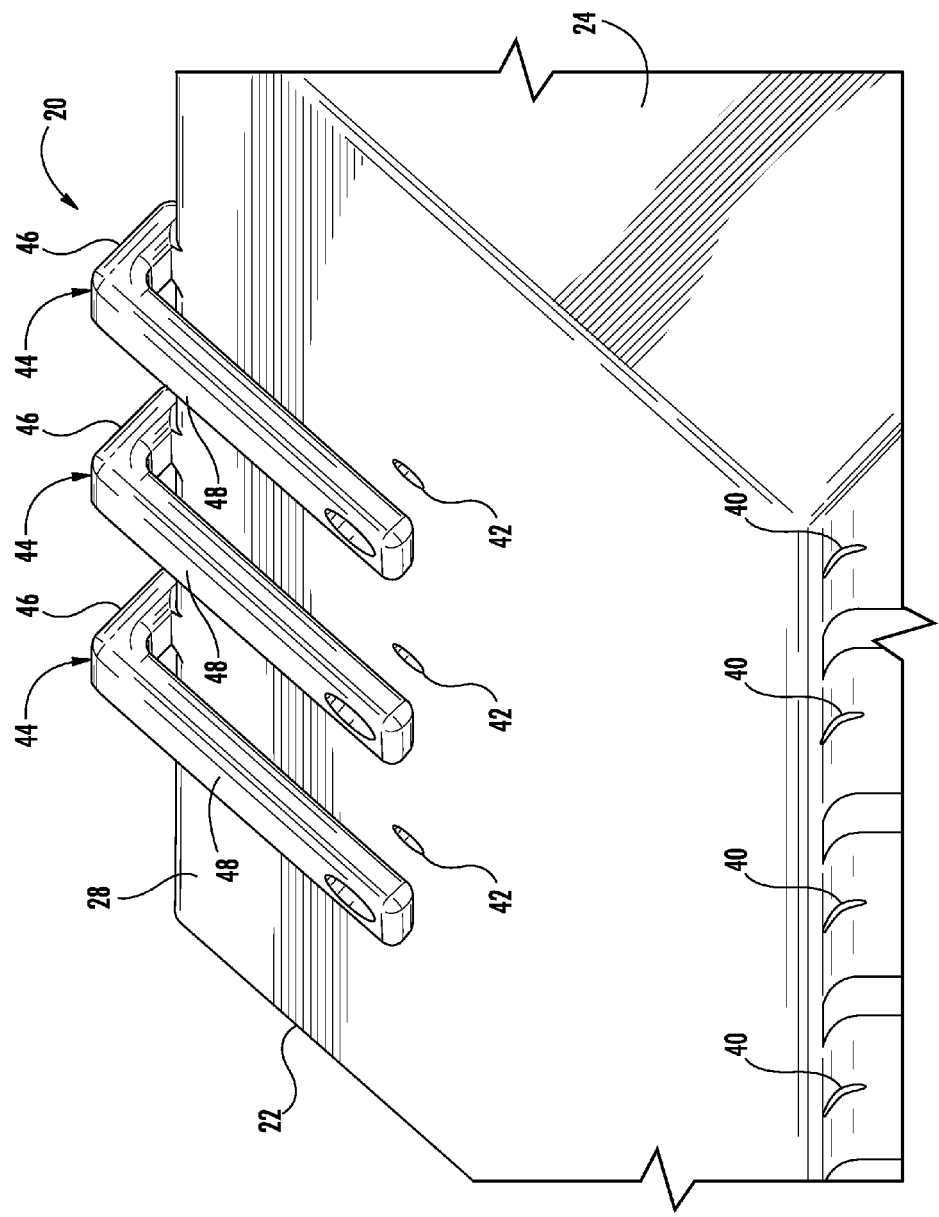
FIG. 11 is a close-up left rear perspective view of an upper rear surface of the modular plant tray as shown in FIG. 1.
Figure 12:
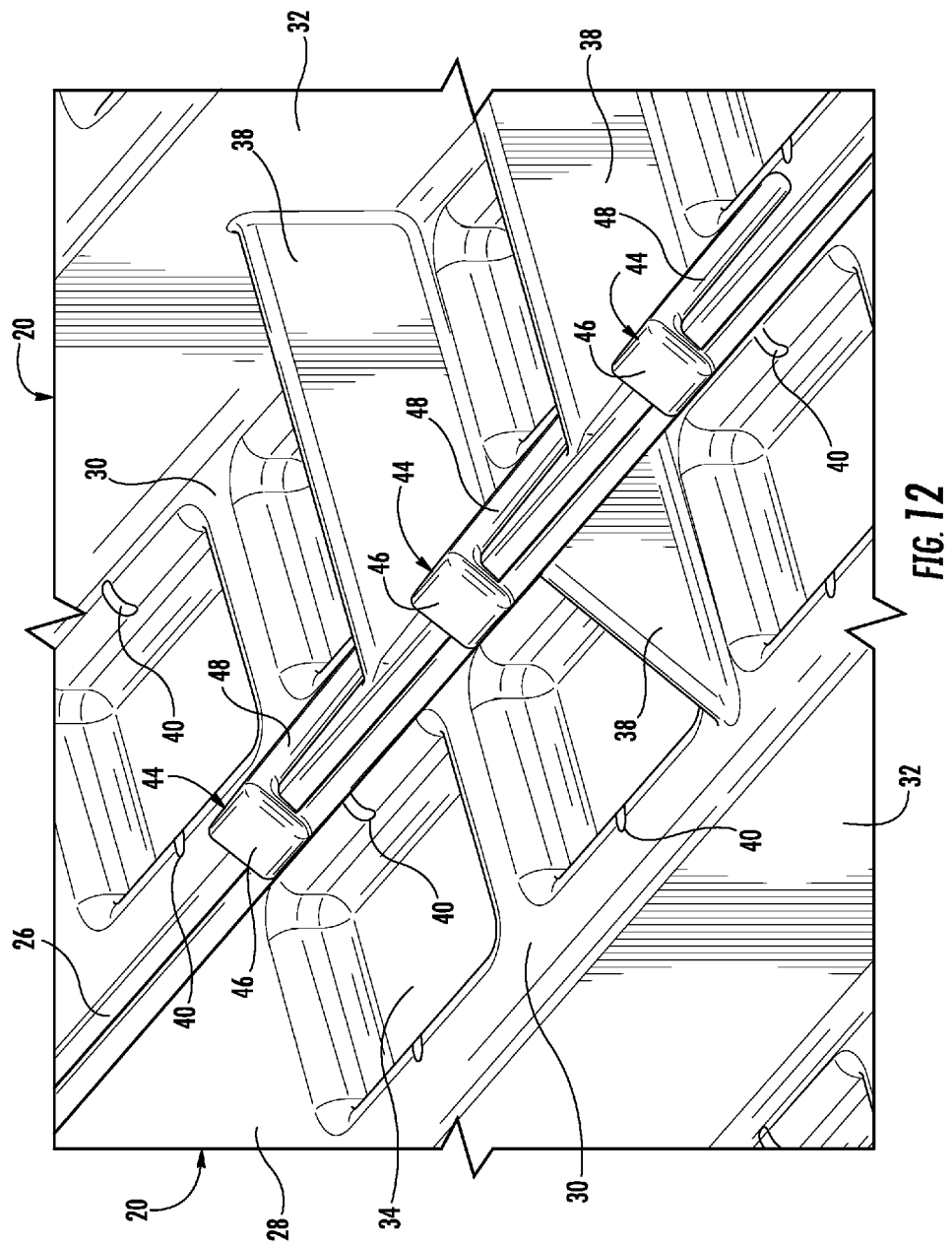
FIG. 12 is a close-up right front perspective view of the connected modular plant trays as shown in FIG. 7.

Referring to FIG. 11, a plurality of hooks 44 may be included on the upper end wall 28. The hooks 44 may be generally U-shaped, comprising a flange 46 extending perpendicularly outwardly from the edge of the upper end wall 28. The flange 46 terminates in an outer leg 48 extending perpendicularly downwardly from the distal end of the flange 46 and parallel to the outer surface of the upper end wall 28. As best shown in FIG. 12, the hooks 44 are dimensioned to receive the planar lower end wall 26 of a second modular tray 20 positioned adjacent the upper end wall 28 of the first modular tray 20. The hooks 44 of the first modular tray 20 fits over the lower end wall 26 of the second tray and extend inside the second tray. The hooks 44 thereby provide a manner for releasably interconnecting and securing together adjacent modular trays 20. Connecting the trays 20 helps prevent any separation from forming between the trays, thereby helping to avoid gaps or creases in the vegetation covering of a roof.

Figure 14:
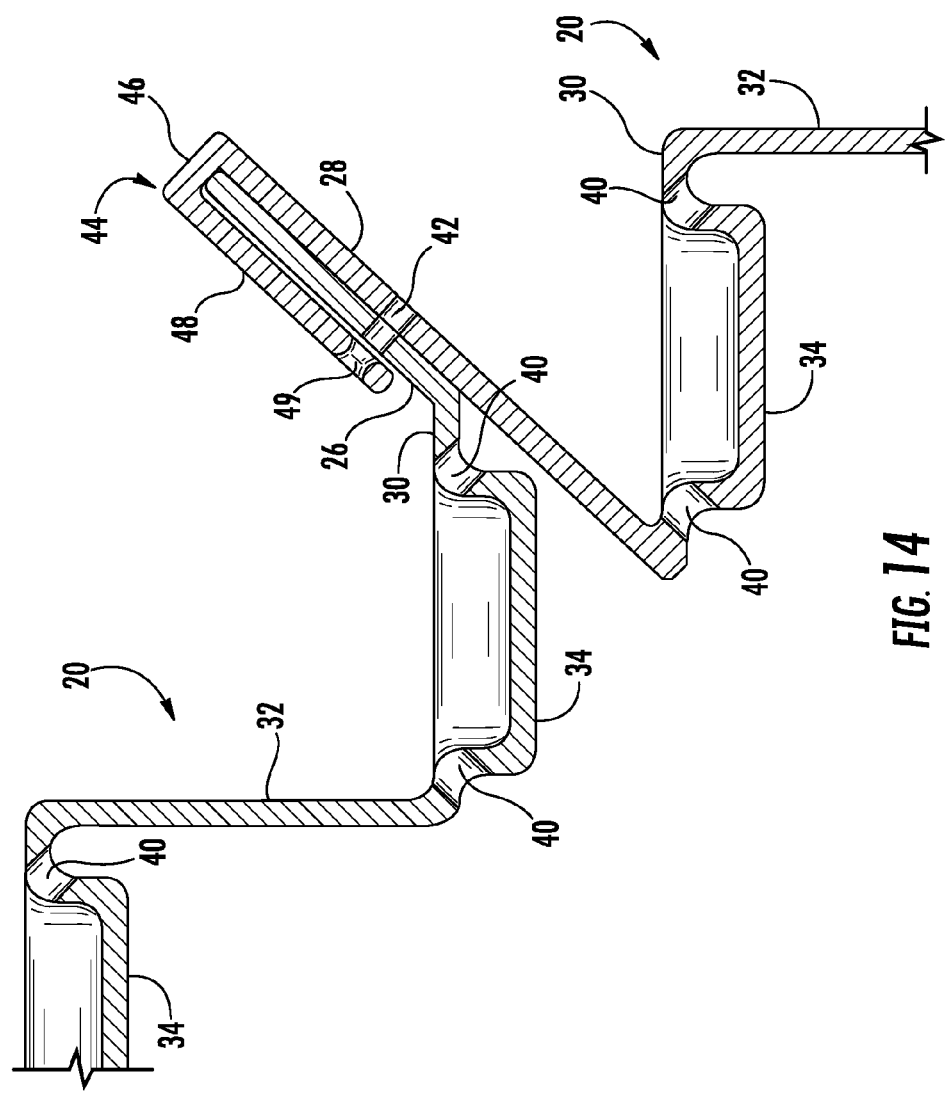
FIG. 14 is a longitudinal cross-section view of a portion of the connected modular plant trays as shown in FIG. 7.

Adjacent modular trays 20 may be further secured via the drainage holes 42 in the sidewalls 22, 24 and the end walls 26, 28 of adjacent trays. When the modular trays 20 are aligned, the drainage holes 42 will match up from one modular tray 20 to the adjacent modular trays. A hole 49 is also provided in the legs 48 of the hooks 44, the holes 49 aligning with the drainage holes 42 in the lower end wall 26 and the upper end wall 48 of connected modular trays 20 (FIG. 14). The modular trays 20 may then be connected by suitable fasteners inserted through the holes 42, 49 to secure together the adjacent trays. One example of a fastener type is a plastic push pin, commonly known as a Pine Tree push pin, that is conically ridged has fins that catch when pushed into a hole. The ridges defined on such fasteners prevent the fastener from being pulled back out of the holes once they are pushed in. Such fasteners may be inserted manually without the need for a separate tool, such as a screwdriver or the like. Other types of fasteners may, of course, also be used including, for example, zip-ties. The fasteners maintain the adjacent modular trays 20 in their correct positioning. A solid attachment between neighboring modular trays 20 is valuable to the quality of a green roof. In particular, the visual expression is improved by ensuring soil-to-soil contact between modular trays 20 to provide seamless borders. The system of fastening adjacent modular trays 20 to one another enables the entire system to be secured onto the roof by either an over-the-peak counterweight system or an edge retainer (not shown). The structural ribs connecting the top and bottom walls to the bottom of the module ensure the walls are not broken by pushing or pulling forces from adjacent modules. Moreover, the rigidity of the system of modular trays 20 improves wind stability of the green roof.

Figure 15:
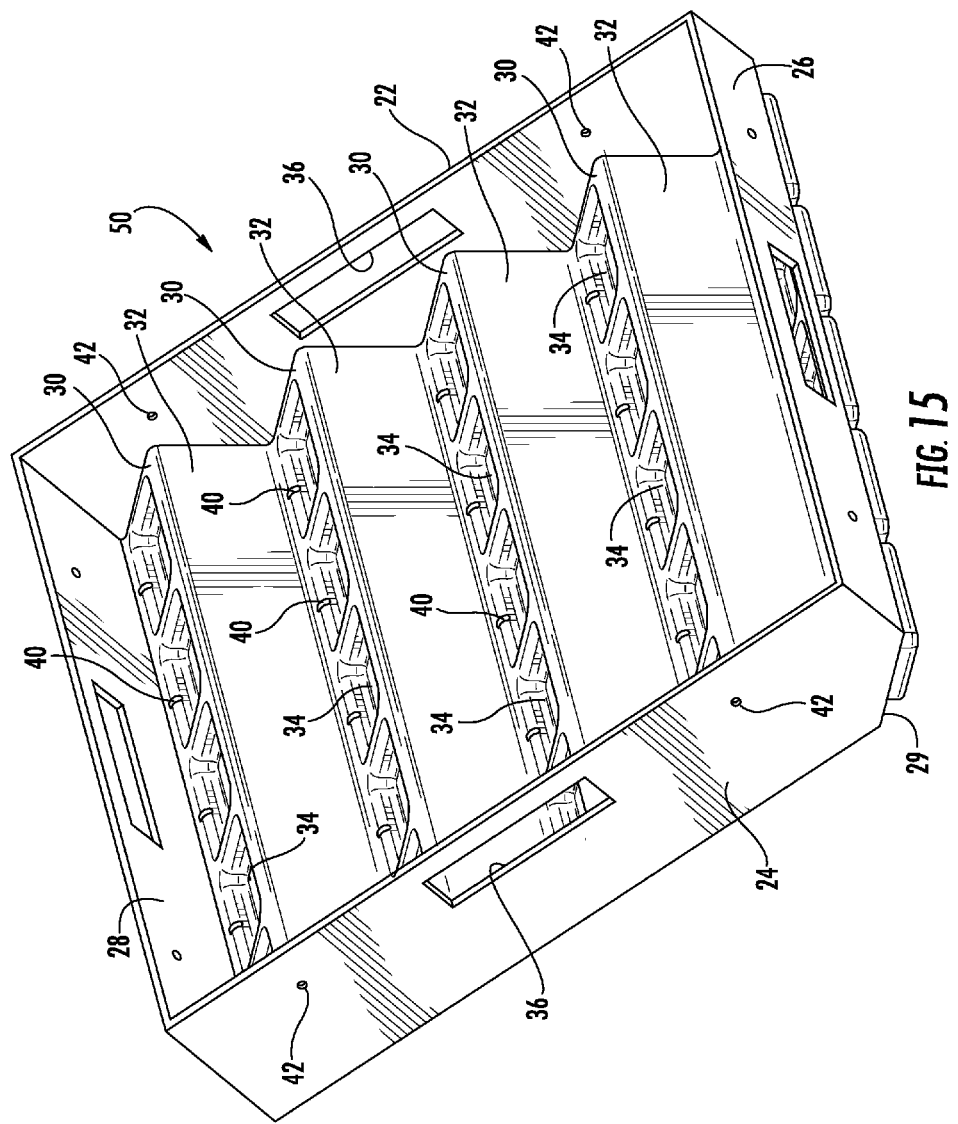
FIG. 15 is a front perspective view of a second embodiment of a modular plant tray.

FIG. 15 shows a second embodiment of the modular tray generally designated at 50. This embodiment of the modular does not include the ribs 38 or the hooks 44. The lower end wall 26 and the upper end wall 28 each have openings for handles 36. The modular tray 50 can be stacked inside other modular trays for shipping. The sidewalls 22, 24 and the end walls 26, 28 of the modular tray 50 may taper outwardly from bottom to top so the modular trays 50 will nest inside the one another when stacked.

In use, the modular tray 20 is filled with a growth medium for supporting vegetation or other components that would typically accompany the modular tray 20 in making a green roof, including a fabric layer comprising a geotextile fabric with good drainage characteristics. The growth medium, such as soil, should be appropriate for the planted vegetation. The soil may incorporate moisture retaining polymers and seeds or live plants of the desired vegetation. The vegetation, if used for green roof purposes, should be a variety of hardy plants that are able to thrive in the local climate.

As shown in FIGS. 7-10, the modular trays 20 are arranged side-by-side and end-to-end in a grid-like fashion for placement on the roof surface. This arrangement is repeated to create a continuous area of the modular trays 20 as large, or as small, as the user desires. The modular trays 20 are connected together along their adjoining lower and upper end walls 26, 28 by the hooks 44 and are held firmly together along their adjacent sidewalls 22, 24 and end walls 26, 28 by fasteners forming the green roof system. The bottom wall 29 engages the inclined roof and, with the height of the platforms 30 being stepped, the platforms 30 determine a plurality of common planes in an arrangement of stepped terraces. In some systems, more than one size of the risers 32 may be included wherein each of the risers 32 has a different height. This allows for different terracing effects to be created on a given roof. Where a stronger attachment to the roof is required, for example, due to the likelihood of strong winds or a sloped surface, screws can be inserted through the bottom walls 29 to attach them to the roof.

Once the modular trays 20 are in place on the roof, the method further comprises filling the modular trays 20 with the components of the green roof system. Alternatively, the growth medium and the plant matter may be grown in a plurality of individual modular trays 20 at a first location, such as a greenhouse, and then the pre-vegetated modular trays may be transported to a second location, such as a home or business, where the trays may be arranged in a grid-like fashion to cover the roof or one or more walls of the home or business as described above. In this manner, an entire pre-vegetated green roof or green wall may be installed in a relatively short period of time.

When in place on a pitched roof, the water retention cups 34 under the growing medium and vegetation open generally upwardly and retain water. Water not collected by the plants or growing medium will filter down into the water retention cups 34. Excess water above a predetermined volume in the water retention cups 34 is drained through the slots 40 in the front and back of the water retention cups 34 and onto the roof. Placing the slots 40 at least at the front and the back of the water retention cups 34 allows for installation of the modular trays 20 on pitched roofs having different slopes. For example, if a modular tray 20 is placed on a roof having a slope steep enough that the platforms 30 are canted forwardly, excess water will simply drain slightly primarily through the front slot 40. If the modular tray 20 is placed on a roof having a shallower slope, the platforms 30 will be canted rearwardly and water will drain slightly primarily through the rear slot 40. This configuration ensures that the modular tray 40 does not overfill with water when placed on roofs having different slopes. Moreover, the water retention cups 34 provide the vegetation with a continuous supply of water even when it is not currently raining, allowing the green roof to be as low maintenance as possible.

Although the modular tray has been shown and described in considerable detail with respect to only a few exemplary embodiments thereof, it should be understood by those skilled in the art that I do not intend to limit the modular tray to the embodiments since various modifications, omissions and additions may be made to the disclosed embodiments without materially departing from the novel teachings and advantages, particularly in light of the foregoing teachings. For example, an alternative use for the modular tray 20 would be as a water collection or detainment system, which would be accomplished by sealing the slots 40 and the drainage holes 42 such that the modular tray 20 be used for the sole purpose of collecting and storing excess water. Accordingly, I intend to cover all such modifications, omission, additions and equivalents as may be included within the spirit and scope of the modular tray as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A modular tray for covering a portion of a surface with vegetation in a growth medium, the modular tray comprising:
   a tray including a pair of sidewalls, a lower end wall and an upper end wall extending between and interconnecting the ends of the sidewalls such that the walls define a perimeter of the tray;
   a bottom wall extending between and interconnecting one end of the sidewalls and the lower end wall, the bottom wall extending in a plane disposed at an angle with the respect to the longitudinal axis of the sidewalls;
   a plurality of platforms having a front edge and an opposed rear edge, the platforms extending between and interconnecting the sidewalls and disposed at an angle with respect to the longitudinal axis of the sidewalls, each of the platforms defining a plurality of recesses spaced longitudinally along the platform, wherein each of the recesses form a water retention cup; and
   a plurality of risers, each of the risers extending between the rear edge of a platform to the front edge of an adjacent platform,
   wherein the tray is water impermeable for containing the growth medium and vegetation.

2. The modular tray as recited in claim 1, wherein each of the platforms defines a pairs of opposed slots along the front edge and the rear edge of the platform adjacent each recess.

3. The modular tray as recited in claim 1, wherein each of the sidewalls and the lower end wall and the upper end wall define a plurality of drain holes for allowing water to pass therethrough.

4. The modular tray of claim 1, wherein the upper end wall has at least one coupling member, the coupling member configured to engage with the lower end wall of another modular tray.

5. The modular tray as recited in claim 1, wherein each of the sidewalls define an opening sized to function as a handle for lifting and carrying the modular tray.

6. The modular tray as recited in claim 1, wherein each of the plurality of platforms is parallel to the other platforms.

7. The modular tray as recited in claim 1, wherein each riser is perpendicular to the interconnected platforms.

8. A modular green roof system for a roof, the modular system comprising:
   a plurality of water impermeable trays for containing growth medium and vegetation, each tray including a pair of sidewalls, a lower end wall and an upper end wall extending between and interconnecting the ends of the sidewalls such that the walls define a perimeter of the tray,
   a bottom wall extending between and interconnecting one end of the sidewalls and the lower end wall, the bottom wall extending in a plane disposed at an angle with the respect to the longitudinal axis of the sidewalls,
   a plurality of platforms having a front edge and an opposed rear edge, the platforms extending between and interconnecting the sidewalls and disposed at an angle with respect to the longitudinal axis of the sidewalls, each of the platforms defines a plurality of recesses spaced longitudinally along the platform, wherein each of the recesses form a water retention cup; and
   a plurality of risers, each of the risers extending between the rear edge of a platform to the front edge of an adjacent platform,
   wherein the trays are releasably connected to one another resting on a roof in side-by-side relation so as to cover a predefined space on the roof to establish a green roof.

9. The modular green roof system as recited in claim 8, wherein each of the platforms defines a pairs of opposed slots along the front edge and the rear edge of the platform adjacent each recess.

10. The modular green roof system as recited in claim 8, wherein each of the sidewalls and the lower end wall and the upper end wall define a plurality of drain holes for allowing water to pass therethrough.

11. The modular green roof system as recited in claim 8, wherein the upper end wall has at least one coupling member, the coupling member configured to engage with the lower end wall of another modular tray.

12. The modular green roof system as recited in claim 8, wherein each of the sidewalls define an opening sized to function as a handle for lifting and carrying the modular tray.

13. The modular green roof system as recited in claim 8, wherein each of the plurality of platforms is parallel to the other platforms.

14. The modular green roof system as recited in claim 8, wherein each riser is perpendicular to the interconnected platforms.

15. A method of constructing a modular green roof system for a roof, the method comprising the steps of:
   providing a plurality of modular trays, each tray including a pair of sidewalls, a lower end wall and an upper end wall extending between and interconnecting the ends of the sidewalls such that the walls define a perimeter of the tray,
   a bottom wall extending between and interconnecting one end of the sidewalls and the lower end wall, the bottom wall extending in a plane disposed at an angle with the respect to the longitudinal axis of the sidewalls,
   a plurality of platforms having a front edge and an opposed rear edge, the platforms extending between and interconnecting the sidewalls and disposed at an angle with respect to the longitudinal axis of the sidewalls, each of the platforms defines a plurality of recesses spaced longitudinally along the platform, wherein each of the recesses form a water retention cup; and a plurality of risers, each of the risers extending between the rear edge of a platform to the front edge of an adjacent platform;

filling the trays with green roof materials;

positioning the trays onto an area of the roof in adjacent side-by-side relation; and interconnecting the adjacent trays.

16. The method as recited in claim 15, wherein each of the platforms defines a pairs of opposed slots along the front edge and the rear edge of the platform adjacent each recess.

17. The method as recited in claim 15, wherein each of the sidewalls and the lower end wall and the upper end wall define a plurality of drain holes for allowing water to pass therethrough.

18. The method as recited in claim 15, wherein the upper end wall has at least one coupling member, the coupling member configured to engage with the lower end wall of another modular tray.

19. The method as recited in claim 15, wherein each of the sidewalls define an opening sized to function as a handle for lifting and carrying the modular tray.

20. The method as recited in claim 15, wherein each of the plurality of platforms is parallel to the other platforms.

21. The method as recited in claim 15, wherein each riser is perpendicular to the interconnected platforms.

* * * * *